United States Patent
Kang et al.

(10) Patent No.: US 11,115,597 B2
(45) Date of Patent: Sep. 7, 2021

(54) MOBILE TERMINAL HAVING FIRST AND SECOND AI AGENTS INTERWORKING WITH A SPECIFIC APPLICATION ON THE MOBILE TERMINAL TO RETURN SEARCH RESULTS

(71) Applicant: LG ELECTRONICS INC., Seoul (KR)

(72) Inventors: Jaeryong Kang, Seoul (KR); Mingyoung Kam, Seoul (KR); Jongseol Kim, Seoul (KR); Myoseop Sim, Seoul (KR); Hyunju Oh, Seoul (KR); Bomi Jang, Seoul (KR); Jaeki Cho, Seoul (KR); Dongki Cheon, Seoul (KR); Jahee Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/490,002

(22) PCT Filed: Jun. 3, 2019

(86) PCT No.: PCT/KR2019/006662
§ 371 (c)(1),
(2) Date: Aug. 29, 2019

(87) PCT Pub. No.: WO2020/171295
PCT Pub. Date: Aug. 27, 2020

(65) Prior Publication Data
US 2020/0068135 A1 Feb. 27, 2020

Related U.S. Application Data

(60) Provisional application No. 62/808,255, filed on Feb. 20, 2019.

(51) Int. Cl.
*G06F 16/28* (2019.01)
*H04N 5/232* (2006.01)
(Continued)

(52) U.S. Cl.
CPC ..... *H04N 5/232933* (2018.08); *G06F 3/0488* (2013.01); *G06F 16/283* (2019.01);
(Continued)

(58) Field of Classification Search
CPC .......... H04N 5/232933; H04N 5/23216; G06F 16/3334; G06F 16/951; G06F 3/0488;
(Continued)

(56) References Cited

U.S. PATENT DOCUMENTS 9,547,647 B2    1/2017  Badaskar
10,296,540 B1*  5/2019  Bhole ..................... G06F 16/51
(Continued)

FOREIGN PATENT DOCUMENTS

KR    10-2005-0095739 A    9/2005
KR    10-2011-0003849 A    1/2011
(Continued)

*Primary Examiner* — Beau D Spratt
(74) *Attorney, Agent, or Firm* — Birch, Stewart, Kolasch & Birch, LLP

(57) ABSTRACT

The present disclosure provides a mobile terminal having a plurality of artificial intelligence (AI) agents. More particularly, a mobile terminal according to the present disclosure includes: a camera, a touch screen configured to display screen information, and a controller configured to activate the camera in response to a request of a user, and store an image received through the camera. The controller extracts a search keyword from a search command when the search command for searching image information is input via a first AI agent, retrieves at least one piece of image information corresponding to the search keyword from pre-stored image information through a second AI agent, and controls the
(Continued)

touch screen such that a search result is displayed on an execution screen of the first AI agent.

16 Claims, 15 Drawing Sheets

(51) Int. Cl.
G06F 16/33 (2019.01)
G06F 16/951 (2019.01)
G10L 15/22 (2006.01)
G10L 15/16 (2006.01)
G06N 3/00 (2006.01)
G06F 3/0488 (2013.01)

(52) U.S. Cl.
CPC ........ G06F 16/3334 (2019.01); G06F 16/951 (2019.01); G06N 3/004 (2013.01); G10L 15/16 (2013.01); G10L 15/22 (2013.01); H04N 5/23216 (2013.01); G10L 2015/223 (2013.01)

(58) Field of Classification Search
CPC ....... G06F 16/583; G06N 3/004; G10L 15/16; G10L 15/22; G10L 2015/223
See application file for complete search history.

(56) References Cited

U.S. PATENT DOCUMENTS

| | | |
|---|---|---|
| 2003/0167167 A1 | 9/2003 | Gong |
| 2007/0005570 A1 | 1/2007 | Hurst-Hiller et al. |
| 2009/0319941 A1 | 12/2009 | Laansoo et al. |
| 2011/0307254 A1 | 12/2011 | Hunt et al. |
| 2012/0294520 A1* | 11/2012 | Mei ........................ G06F 16/434 382/164 |
| 2014/0278435 A1 | 9/2014 | Ganong, III et al. |
| 2016/0140146 A1* | 5/2016 | Wexler ................ G06F 16/5846 707/741 |
| 2016/0267326 A1* | 9/2016 | Yagev ................... G06K 9/4647 |
| 2017/0161268 A1 | 6/2017 | Badaskar |
| 2017/0351712 A1* | 12/2017 | Jung ....................... G06F 16/29 |
| 2019/0042079 A1* | 2/2019 | Choi ..................... G06F 3/0488 |
| 2019/0251975 A1* | 8/2019 | Choi ....................... G06F 21/32 |

FOREIGN PATENT DOCUMENTS

| | | |
|---|---|---|
| KR | 10-2014-0083569 A | 7/2014 |
| KR | 10-2015-0075389 A | 7/2015 |
| KR | 10-2015-0111552 A | 10/2015 |
| KR | 10-2016-0094307 A | 8/2016 |

* cited by examiner

FIG. 8
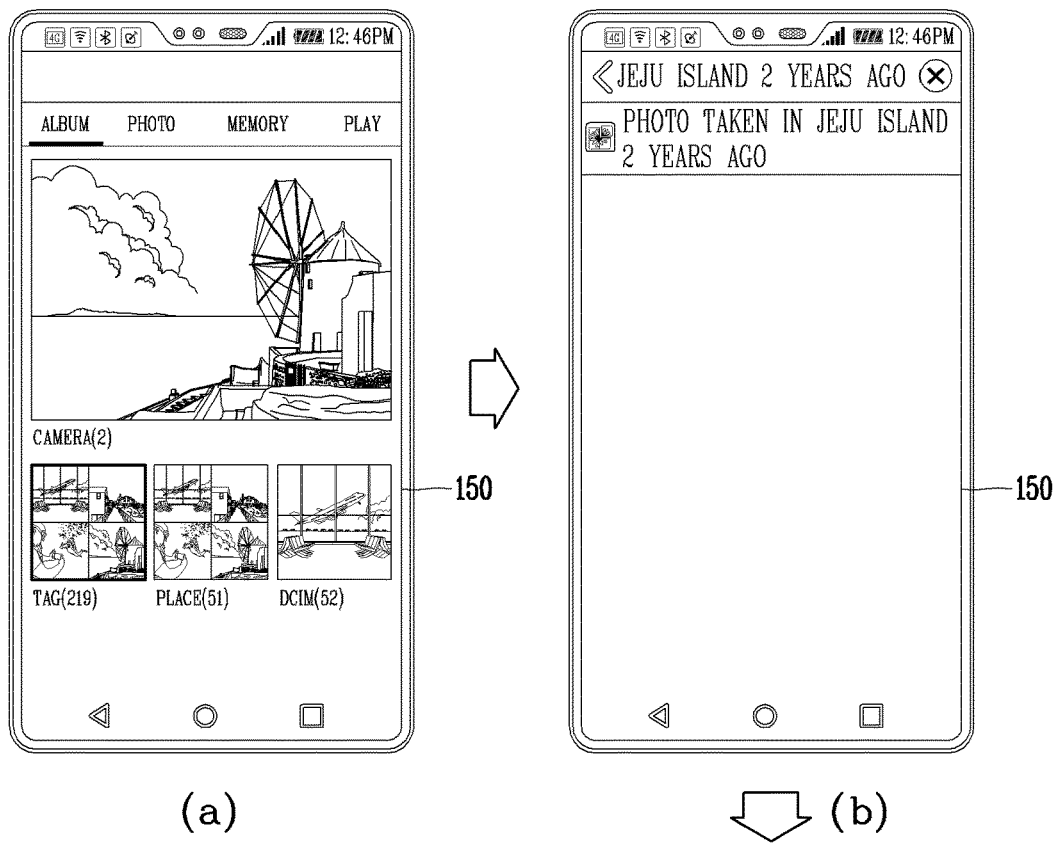
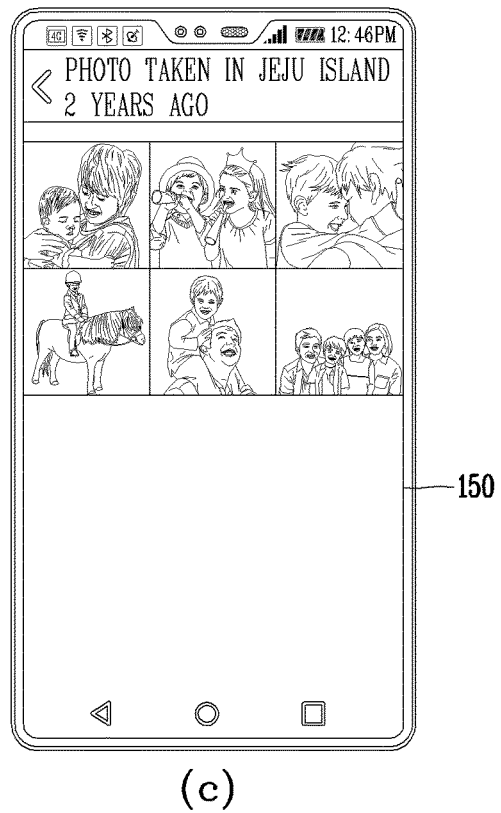

FIG. 9
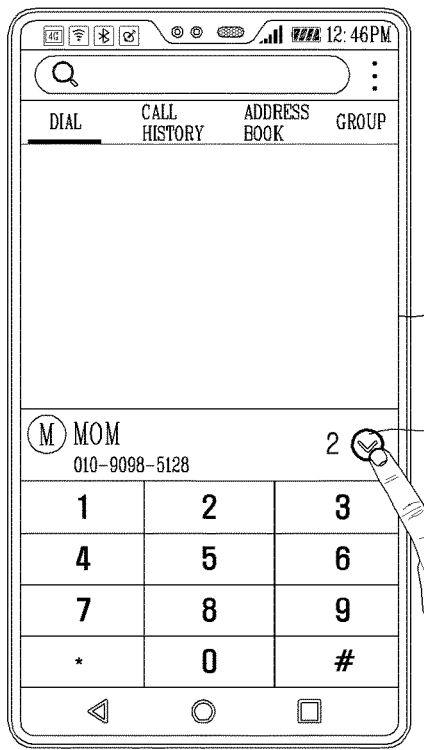
(a)
[DIAL]
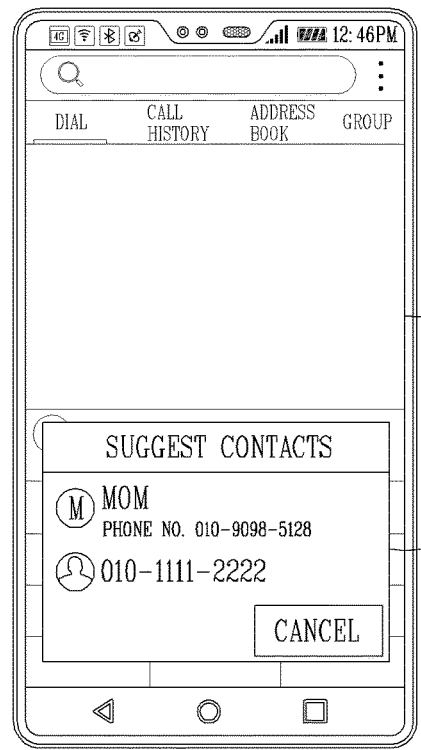
(b)
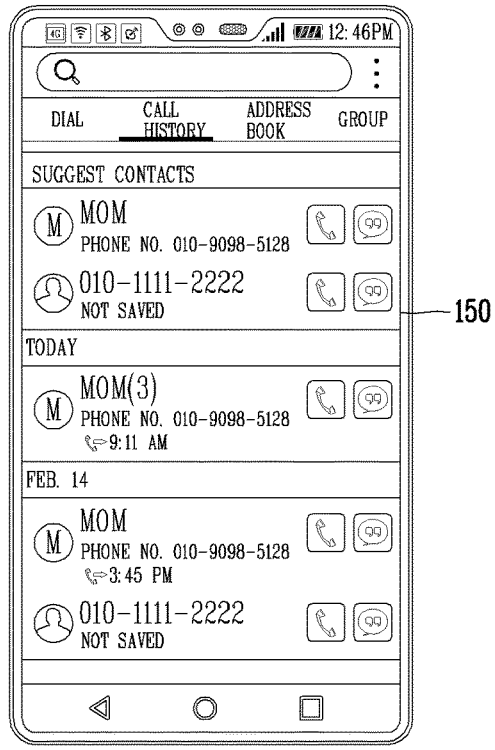
[CALL HISTORY]
(c)

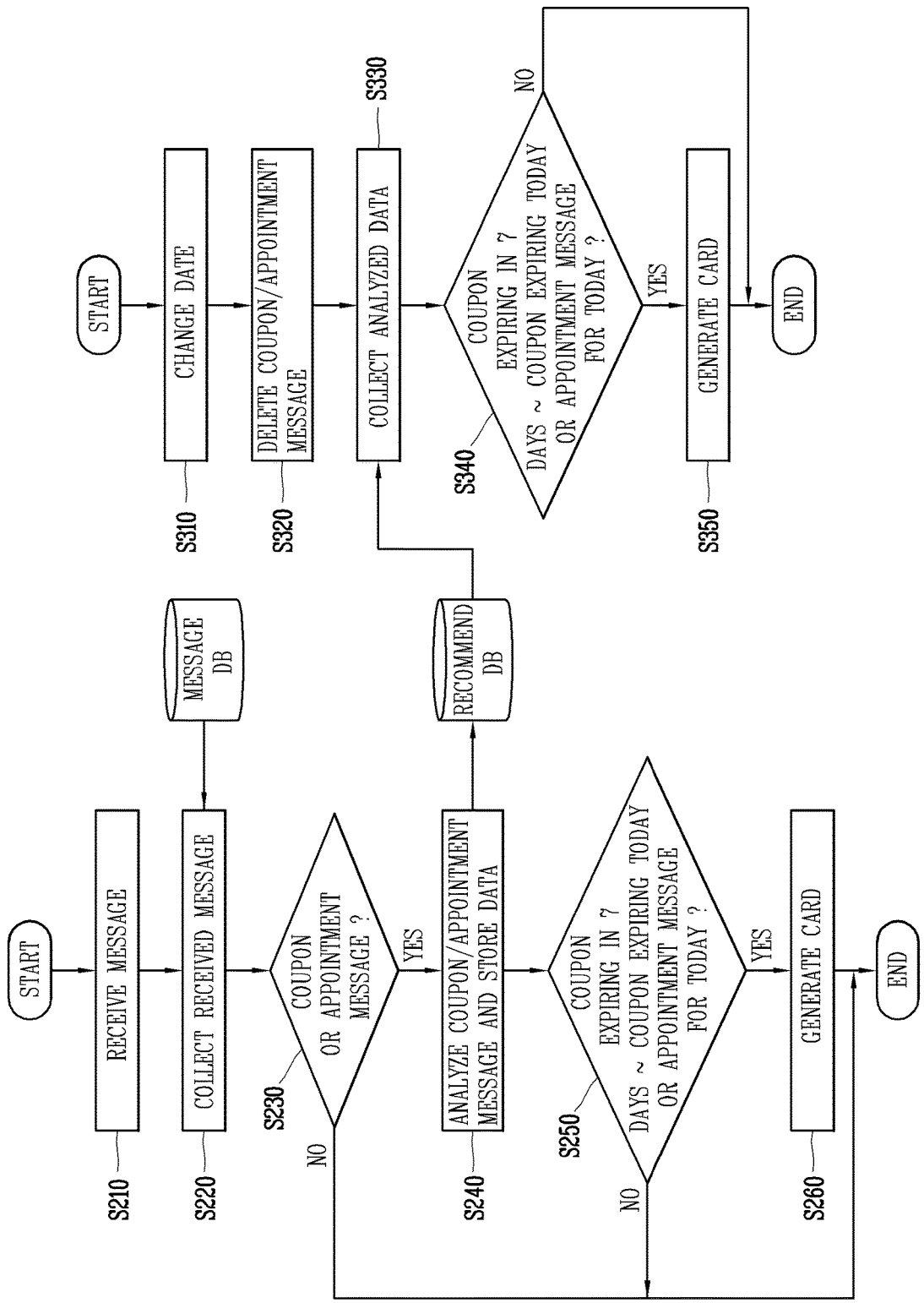

MOBILE TERMINAL HAVING FIRST AND SECOND AI AGENTS INTERWORKING WITH A SPECIFIC APPLICATION ON THE MOBILE TERMINAL TO RETURN SEARCH RESULTS

CROSS-REFERENCE TO RELATED APPLICATIONS

This Application is the National Phase of PCT International Application No. PCT/KR2019/006662 filed on Jun. 3, 2019, which claims the priority benefit under 35 U.S.C. § 119(e) to U.S. Provisional Application No. 62/808,255 filed on Feb. 20, 2019, all of which are hereby expressly incorporated by reference into the present application.

BACKGROUND OF THE INVENTION

Field of the Invention

The present disclosure relates to a mobile terminal having an artificial intelligence unit, and a control method therefor.

Discussion of the Related Art

Artificial intelligence (AI) is an area of computer engineering and information technology (IT) that aims to create computers capable of performing tasks requiring human intelligence such as thinking, learning, and self-development, which enables the computers to mimic human intellectual behavior.

In addition, artificial intelligence does not just exist in itself. It is directly and indirectly related to other areas of computer science in many ways. Nowadays, there have been active attempts to use artificial intelligence elements in a wide range of fields of information technology, especially in problem solving.

Meanwhile, in the related art, a context awareness technology using artificial intelligence has been actively studied for recognizing a user's current situation and providing necessary information to a user in a desirable manner.

With the development of the context awareness technology, there is an increasing demand for a mobile terminal capable of properly responding according to the user's current situation.

SUMMARY OF THE INVENTION

One aspect of the present disclosure is directed to solving the above-mentioned problems and other drawbacks. Another object of the present disclosure is to provide a mobile terminal capable of facilitating interconnection between different artificial intelligence (AI) agents, and a control method therefor.

Still another aspect of the present disclosure is to provide a mobile terminal capable of retrieving pre-stored image information (data) by using a keyword defining a type of a captured image, and a control method therefor.

In order to achieve the aspects and other advantages, there is provided a mobile terminal having a plurality of artificial intelligence (AI) agents. More particularly, a mobile terminal according to the present disclosure includes a camera, a touch screen configured to display screen information, and a controller configured to activate the camera in response to a request of a user and store an image received through the camera. The controller may extract a search keyword from a search command when the search command for searching image information is input via a first AI agent, retrieve at least one piece of image information corresponding to the search keyword from pre-stored image information via a second AI agent, and control the touch screen such that a search result is displayed on an execution screen of the first AI agent.

In one embodiment, the controller may generate category information defining a type of the captured image via the second AI agent, match the captured image with the category information to store the matched information, and retrieve at least one piece of image information corresponding to the search keyword from the pre-stored image information using the category information.

In one embodiment, the controller may collect location information and time information when capturing the image, and store the captured image by matching the collected location information and time information to the captured image.

In one embodiment, the controller may use at least one of the location information, the time information, and the category information to retrieve at least one piece of image information corresponding to the search keyword from the pre-stored image information.

In one embodiment, the category information creation time may be generated at a different time point to when the location information and the time information are collected.

In one embodiment, the controller may collect location information and time information when capturing the image, and generate the category information at a predetermined time via the second AI agent.

In one embodiment, a microphone configured to receive voice information from a user may be further provided. The controller may activate the first AI agent in response to a voice of the user received via the microphone, and receive a search command through the microphone while the first AI agent is being activated.

In one embodiment, the controller may activate the first AI agent when a wake-up word is received through the microphone.

In one embodiment, the controller may activate a different AI agent according to a type of the wake-up word. The controller may control the touch screen such that at least one piece of image information corresponding to the search keyword among the pre-stored image information is displayed on an execution screen of the activated AI agent.

In one embodiment, the controller may control such that the extracted search keyword is transferred from the first AI agent to the second AI agent, and the search result is transferred from the second AI agent to the first AI agent.

In one embodiment, the controller may control such that the extracted search keyword is transferred from the first AI agent to a specific application, and is then transferred to the second AI agent from the specific application.

In one embodiment, the controller may control such that the search result is transferred from the second AI agent to a specific application, and is then transferred to the first AI agent from the specific application.

In one embodiment, the controller may control such that the extracted search keyword is directly transferred to the second AI agent from the first AI agent, and the search result is directly transferred to the first AI agent from the second AI agent.

In order to achieve the aspects and other advantages, there is also provided a method for controlling a mobile terminal having a plurality of artificial intelligence (AI) agents, the method including activating a camera in response to a request of a user and storing an image received through the camera, receiving a search command for retrieving image information via a first AI agent, extracting a search keyword from the search command via the first AI agent, retrieving at least one piece of image information corresponding to the search keyword from pre-stored image information via a second AI agent, and displaying a search result on an execution screen of the first AI agent.

In one embodiment, the extracted search keyword may be transferred from the first AI agent to a specific application, and then transferred to the second AI agent from the specific application, and the search result may be transferred from the second AI agent to a specific application, and then transferred to the first AI agent from the specific application.

Advantageous Effects

According to the present disclosure, different agents can be interconnected to each other by using a specific application as a medium when directly connecting the different agents are not available.

In addition, according to the present disclosure, when capturing an image, category information defining a type of an image is stored together with the image, thereby facilitating later use of the captured image.

BRIEF DESCRIPTION OF THE DRAWINGS

FIG. 8 is a conceptual view illustrating one embodiment of retrieving an image previously captured by using time and location information.

FIG. 9 is a conceptual view illustrating one embodiment in which specific information is provided to a user by retrieving the specific information based on a terminal usage pattern of the user even when there is no search request of the user.

FIG. 10 is a flowchart illustrating one embodiment of providing a reminder to a user using a pre-stored text message.

DETAILED DESCRIPTION OF THE EMBODIMENTS

Figure 1A:
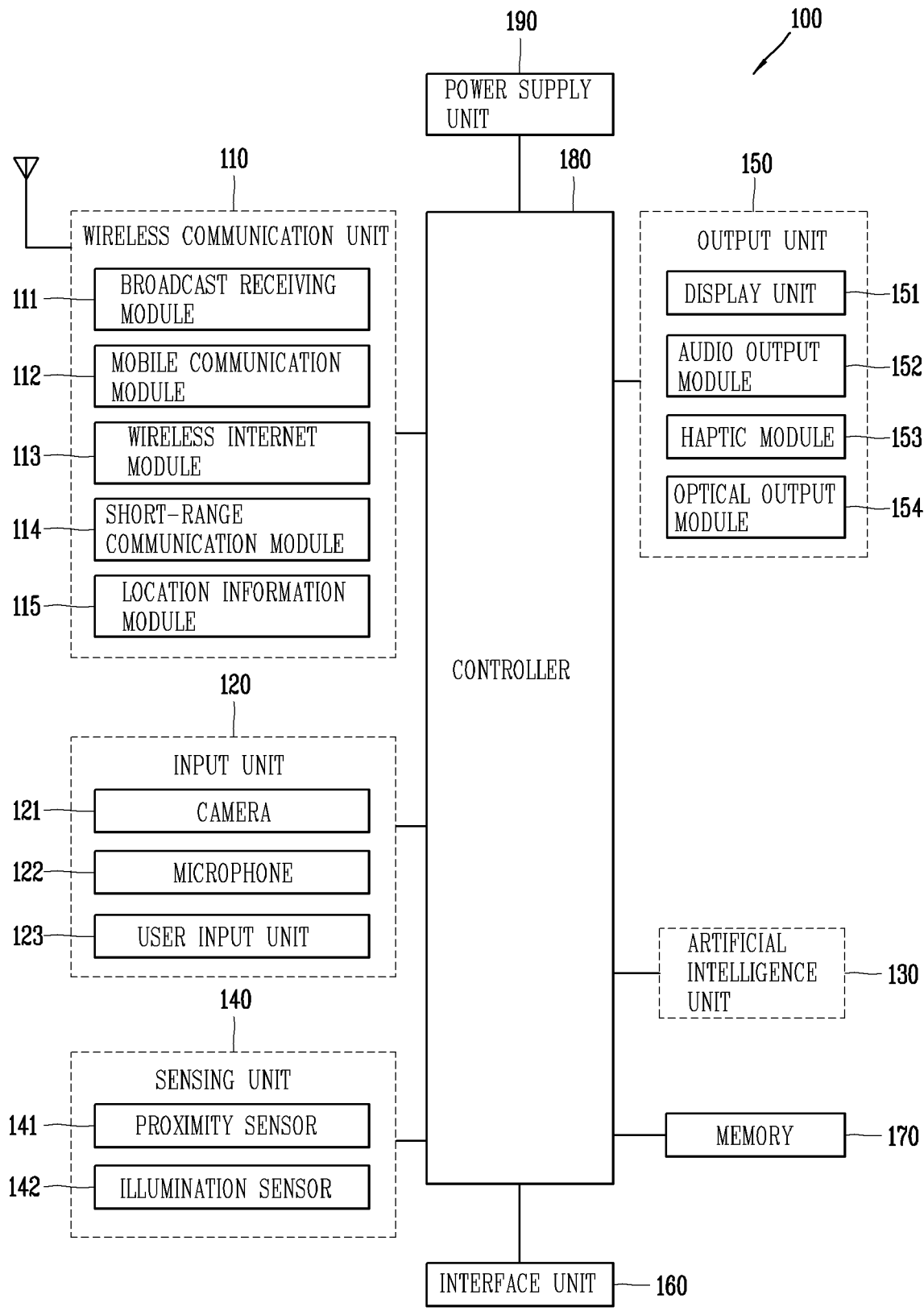
FIG. 1A is a block diagram of a mobile terminal according to an embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
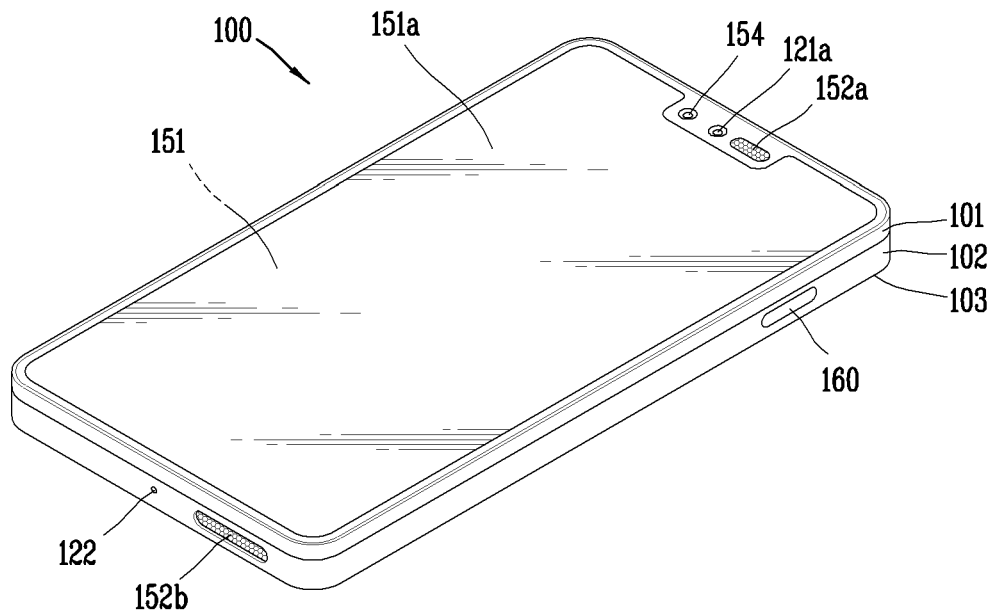
FIGS. 1B and 1C are conceptual views illustrating one example of a mobile terminal according to the present disclosure, viewed from different directions.
Figure 1C:
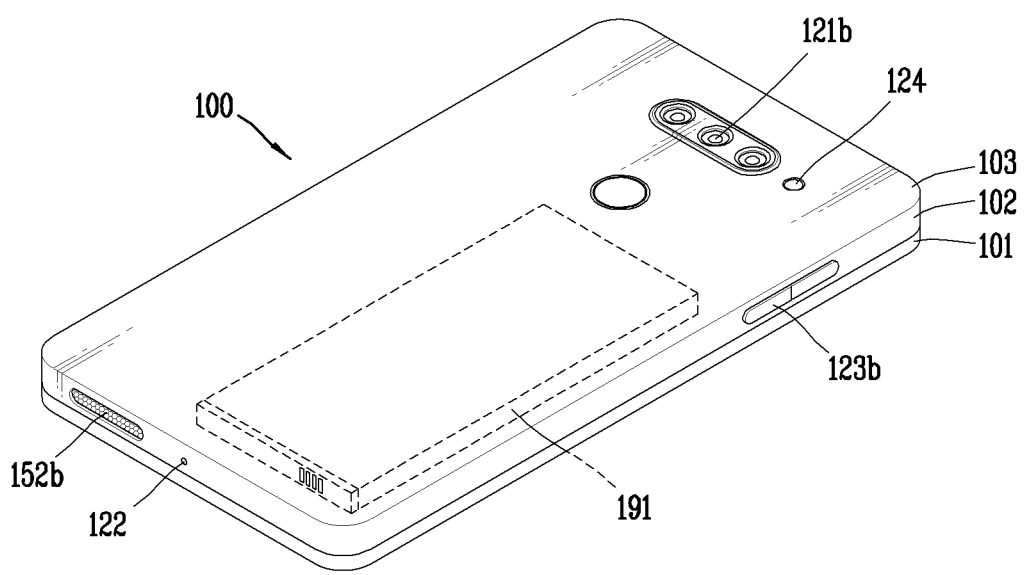

Referring to FIGS. 1A to 1C, FIG. 1A is a block diagram of a mobile terminal according to an embodiment of the present disclosure, and FIGS. 1B and 1C are conceptual views illustrating one example of a mobile terminal, viewed from different directions.

The mobile terminal 100 may be shown having components such as a wireless communication unit 110, an input unit 120, an artificial intelligence unit (or system) 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The artificial intelligence unit 130 performs processing of information based on an artificial intelligence (AI) technology, which may include one or more modules that perform at least one of learning of information, inference of information, perception of information, and natural language processing.

The artificial intelligence unit 130 may use a machine learning technology to perform at least one of learning, inferring and processing a large amount of information (big data), such as information stored in the mobile terminal, environmental information around the mobile terminal, information stored in an external storage capable of performing communication, and the like. The artificial intelligence unit 130 may control the mobile terminal to predict (or infer) at least one executable operation and execute an operation having the highest feasibility among the predicted at least one operation, by using the information learned through the machine learning technology.

The machine learning technology is a technology that collects and learns a large amount of information based on at least one algorithm, and determines (or evaluates) and predicts information based on the learned information. The learning of information is an operation that figures out characteristics, rules, and determination criteria of information, quantifies the relationship (correlation) between information and information, and predicts new data using a quantified pattern.

The at least one algorithm used by the machine learning technology may be a statistical-based algorithm, for example, a decision tree that uses a tree structure type as a prediction model, an Artificial Neural Network (ANN) that mimics neural network architecture and functions, genetic programming based on biological evolutionary algorithms, clustering that distributes observed examples into subsets of clusters, Monte Carlo method that computes function values through randomly extracted random numbers from probability, and the like.

Deep learning, a subfield of machine learning, is a technology that performs at least one of learning, determining, and processing of information using an ANN algorithm. The ANN may have an architecture in which layers are connected to transfer data between layers. This deep learning technology may allow learning of a large amount of information through the ANN using a graphic processing unit (GPU) optimized for parallel computing.

Meanwhile, the artificial intelligence unit 130 may collect (detect, monitor, extract, receive, etc.) signals, data, and information input or output to or from components of the mobile terminal in order to collect an enormous amount of information for applying the machine learning technology. The artificial intelligence unit 130 may also collect (sense, monitor, extract, detect, and receive) data, information, and the like stored in the external storage (e.g., a cloud server). More specifically, collection of information may be understood as a term that includes operations of sensing information through a sensor, extracting information stored in the memory 170, or receiving information from the external storage through communications.

The artificial intelligence unit 130 may sense information in the mobile terminal, environmental information around the mobile terminal, and user information through the sensing unit 140. In addition, the artificial intelligence unit 130 may receive broadcast signals and/or broadcast-related information, wireless signals, wireless data, and the like through the wireless communication unit 110. Furthermore, the artificial intelligence unit 130 may receive image information (or signal), audio information (or signal), data, or information input by a user from the input unit 120.

The artificial intelligence unit 130 collects a large amount of information in the background in real time, learns the collected information, and stores properly processed information (e.g., knowledge graph, command policy, personalization database, communication engine, etc.) in the memory 170.

When an operation of the mobile terminal is predicted based on the learned information using the machine learning technology, the artificial intelligence unit 130 may control the components of the mobile terminal, or may transmit a control command for executing the operation to the controller 180. Then the controller 180 may execute the predicted operation by controlling the mobile terminal based on the control command.

Meanwhile, when a specific operation is performed, the artificial intelligence unit 130 analyzes history information (or data) indicating performance of the specific operation through the machine learning technology, and updates the existing learned information based on the analyzed information. Accordingly, accuracy of information prediction for the artificial intelligence unit 130 can be improved.

Meanwhile, in this specification, the artificial intelligence unit 130 and the controller 180 may be understood as the same component. In this case, functions performed by the controller 180 described herein may be expressed as being performed by the artificial intelligence unit 130, and the controller 180 may be named as the artificial intelligence unit 130, or conversely, the artificial intelligence unit 130 may be referred to as the controller 180.

Alternatively, in this specification, the artificial intelligence unit 130 and the controller 180 may be understood as separate components. In this case, the artificial intelligence unit 130 and the controller 180 may perform various controls on the mobile terminal 100 through mutual data exchange. The controller 180 may perform at least one function on the mobile terminal or may control at least one of the components of the mobile terminal 100 based on a result derived from the artificial intelligence unit 130. Further, the artificial intelligence unit 130 may also operate according to the control of the controller 180.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is implemented to store data to support various functions or features of the mobile terminal 100. The memory 170 may store a plurality of application programs or applications operated in the mobile terminal 100, data for operations of the mobile terminal 100, commands, data for operations of the artificial intelligence unit 130 (e.g., at least one algorithm information for machine learning). Some of these application programs may be downloaded from an external server via wireless communications. Also, at least some of these application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal, or communications between the mobile terminal 100 and a network where another mobile terminal (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input are often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal 100 meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit 123 (see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

The wireless communication unit 110, the input unit 120, and the output unit 150 included in the mobile terminal 100 enables the mobile terminal 100 to perform various types of communications with an external device. The input unit 120 receives communication information from a user. The wireless communication unit 110 transmits information received through the input unit 120 to the external device and receives communication information transmitted from the external device. The output unit 150 outputs communication information received from the external device.

In this specification, communication information is defined as all kinds of information transmitted and received in order to perform communications between a mobile terminal and an external terminal. Here, the communication information may have various types. For example, the communication information may be at least one of voice information, image information, and text information, but it is not limited thereto. The type of communication information may vary depending on a communication method. Specifically, when the communication method is a method using an auditory element, the communication information is voice information, and when the communication method is a method using a visual element, the communication information may be at least one of image information and text information.

Meanwhile, in this specification, signals transmitted and received between telephone communication terminals are also defined as communication information.

Meanwhile, a different input element may be used for inputting communication information according to its type. For example, audio information, video information, and text information may be input by the microphone 122, the camera 121, and the touch screen 151, respectively. In more detail, the audio information may be input via the microphone 122, the video information may be input through the camera 121, and the text information may be input through the touch screen 151.

Also, a different output element may be used for outputting communication information according to its type. For example, the audio information may be output via the speaker, and the video information and the text information may be output through the touch screen 151.

As described above, the mobile terminal uses different input and output elements depending on the communication method. Here, the communication method is determined by an entity that generates a communication event.

The communication event described herein is defined as an event that triggers communication using the mobile terminal, or as reception of communication information itself.

When a communication event triggers communication, the communication event may be that receiving a call signal from an external device for call connection. At this time, communication information may be received only when there is a user request for the communication event. For example, in case of receiving the call signal from the external device, the mobile terminal may receive voice information only when there is a call connection request of the user.

As for the case of receiving communication information itself, a communication event may be that receiving an image or a text message from an external device.

The type of communication information is determined according to a type transmitted by an external device that generated a communication event.

When a communication event is generated, the communication information may be stored in a preset memory. Here, the communication information not only includes information itself transmitted/received to and from an external terminal, but also means information that defines a specific communication event so that a specific communication event is distinguished from another communication event. For example, the communication information may include a time at which a communication event is generated, a type of communication information, location ID of communication information, information of an external terminal, and the like. However, the communication information is not limited thereto.

The present disclosure is designed to make searching for the communication information easier.

To this end, the present disclosure stores the communication information by matching it with another information. Hereinafter, a method for storing the communication information and the communication event will be described in detail.

Figure 2:
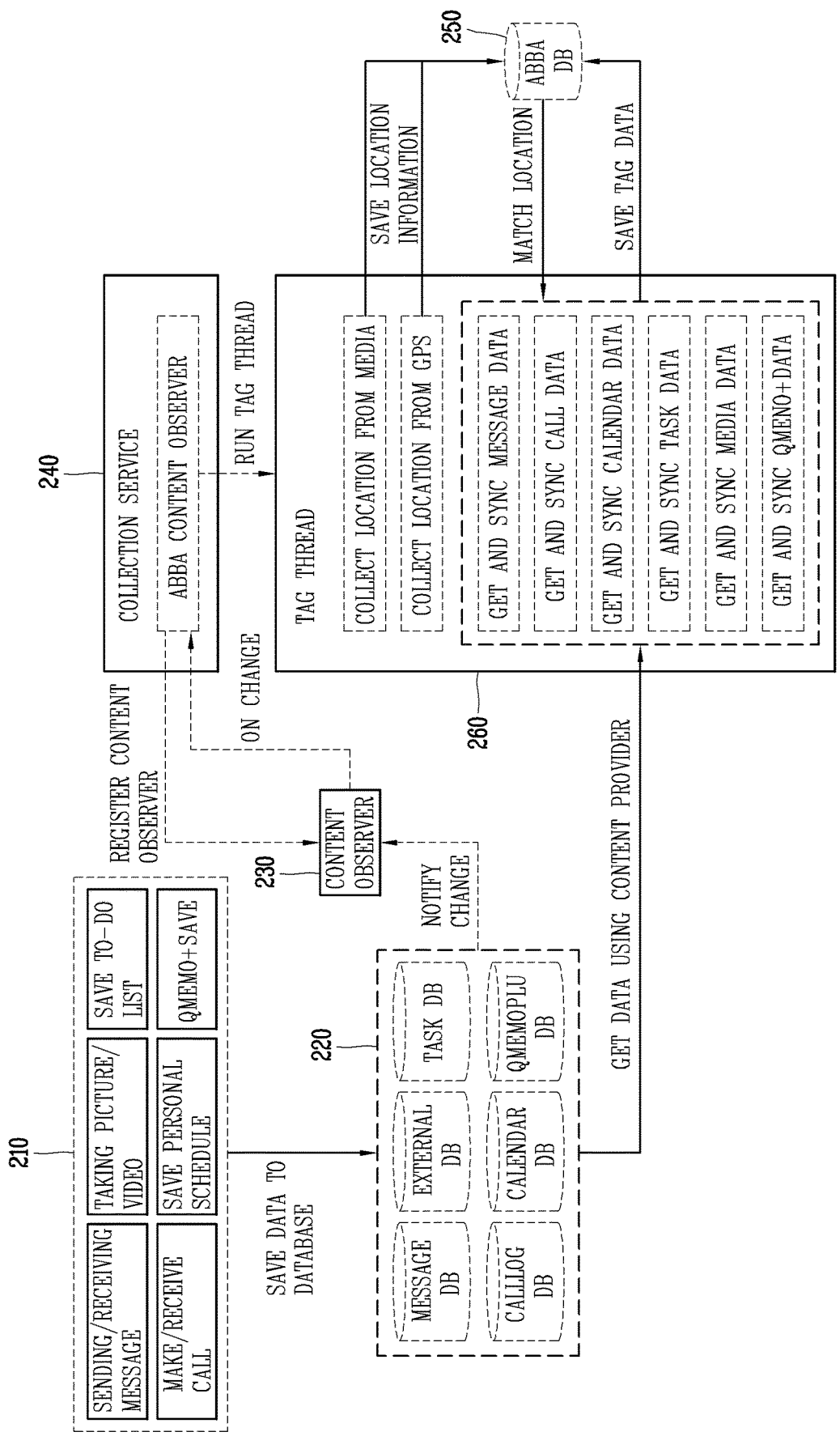
FIG. 2 is a conceptual view illustrating a method in which information (data) is stored by matching communication information and communication event related information with another information.

FIG. 2 is a conceptual view illustrating a method in which information (data) is stored by matching communication information and communication event related information with another information.

Referring to FIG. 2, when a communication event 210 is generated in the mobile terminal 100, the communication information is stored (220) in a preset memory. Here, communication information may be stored in a different database depending on a type of the communication event.

The controller 180 monitors (230, 240) content each time new information is stored in the memory, and matches the new information with another information that can be collected in the mobile terminal 100 before storing it. Specifically, the controller 180 collects current location information of the mobile terminal 100 through GPS embedded in the mobile terminal 100 each time a communication event is generated (see 260). In addition, the controller 180 extracts location information from communication information. The collected location information and extracted location information (hereinafter referred to as "location information") are matched with at least one piece of information related to the communication information before being stored. Here, the location information is stored in a separate database 250. That is, the location information is not necessarily stored in the same database as the communication information. In this specification, the database in which the location information is stored is referred to as a location information database.

The controller 180 may store the location information and location ID of communication information together. Accordingly, communication information matched with the location information can be reached (accessed) through the location information.

Meanwhile, the controller 180 firstly matches location information of the mobile terminal, which is collected when a communication event is generated, with communication information. The controller 180 may match extracted location information with the communication information only when location related information is extracted from the communication information. When the location related information is extracted from the communication information, a plurality of pieces of location information may be matched to the communication information.

Meanwhile, the controller 180 may compare collected location information with pre-stored location information each time location information of the mobile terminal 100 is collected in response to an occurrence of a communication event. At this time, when collected location information satisfies a preset condition, the controller 180 may assign a representative name to the collected location information, and then store it by matching the name with the collected location information.

The preset condition will be described in detail. The controller 180 compares the collected location information with pre-stored location information. When location information the same as the collected location information is found in the pre-stored location information, the controller 180 determines whether there is a representative name matched to the location information found. When there is a matched representative name, the controller 180 matches the representative name to the collected location information to store it.

When there is no matched representative name, and location information the same as the collected location information is searched for more than a predetermined number of times, the controller 180 may create a representative name based on a time period at which the information location is searched. For example, the time period for searching the location information for the predetermined number of times or more is mainly collected in the evening and morning hours, the controller 180 may set a representative name as "home" for the location information. In this case, the same representative name is matched to all the location information retrieved for the predetermined number of times or more.

Meanwhile, it is not limited to the communication event, the controller 180 may also store location information by matching event related information with location information each time a new event is generated in the mobile terminal 100.

Here, the event may include application execution, photographing, storing new data, etc. For example, the controller 180 may activate the camera 121 in response to a user request to capture an image, and store the captured image. When storing the captured image, the controller 180 may match location information to the captured image.

As another example, the controller 180 may receive personal schedule information input from the user and store it in the memory 170. At this time, the controller 180 may store the personal schedule information by matching location information to it.

As described above, the mobile terminal according to the present disclosure stores information (data) by matching location information to communication information each time a communication event is generated, and stores information (data) by matching location information to the event related information for storing each time a new event is generated.

Thereafter, when a request for communication information searching is input from the user, the controller 180 retrieves pre-stored communication information using a search query (search term) input by the user.

Hereinafter, an exemplary embodiment of searching for communication information and event related information in response to a search request of a user will be described in detail.

Figure 3:
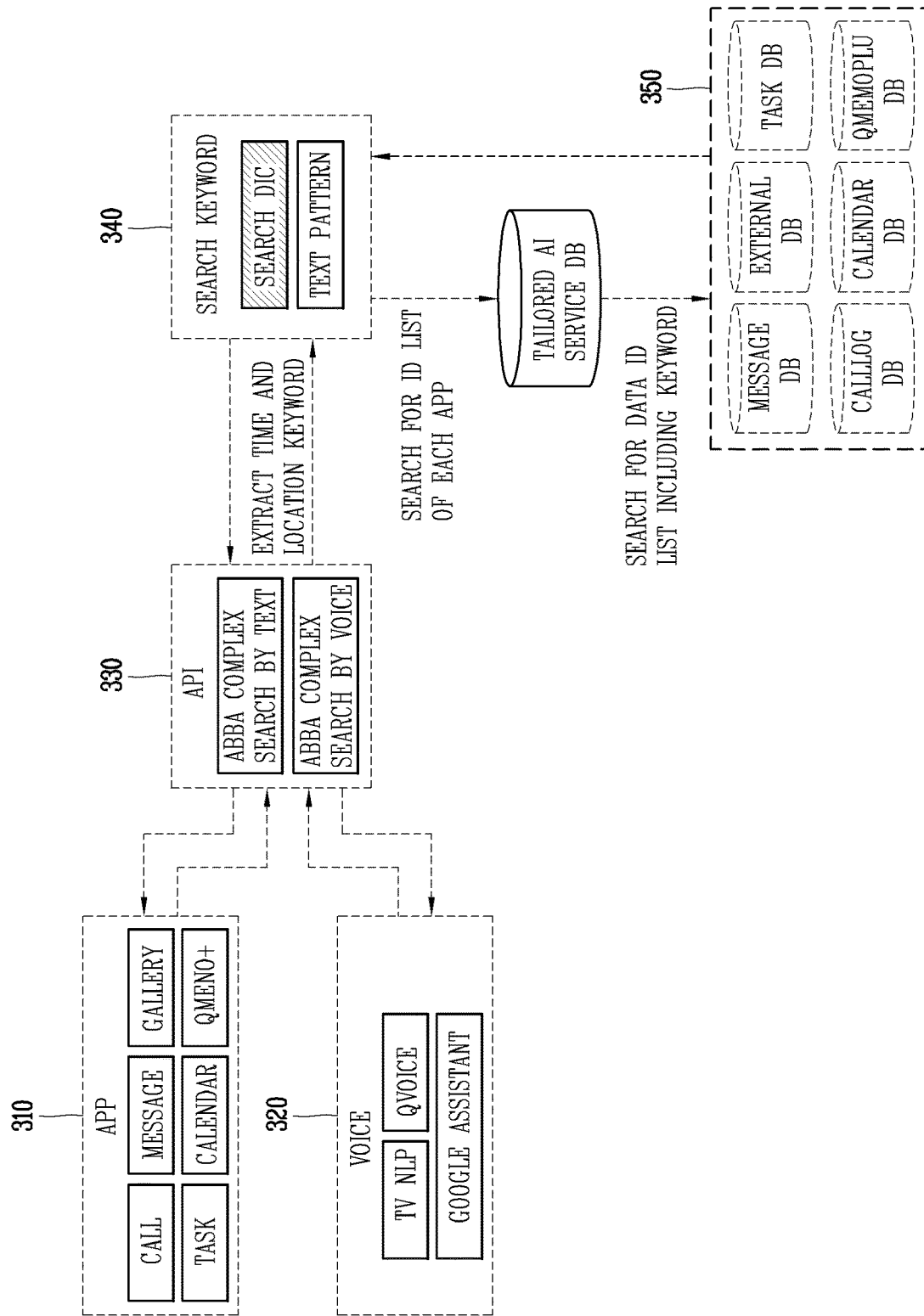
FIG. 3 is a block diagram illustrating searching for communication information and event related information in a mobile terminal according to one embodiment of the present disclosure.

FIG. 3 is a block diagram illustrating searching for communication information and event related information in a mobile terminal according to one embodiment of the present disclosure.

Referring to FIG. 3, a plurality of applications 310 may be installed in the mobile terminal. An event or a communication event may be generated through the applications.

For example, the mobile terminal according to the present disclosure may send and receive text messages with another terminal through a messenger application. Here, sent and received text messages are stored.

As another example, the mobile terminal according to the present disclosure may activate the camera 121 and store an image received by the camera 121 through an image capture application.

As described above, applications are executed and information of application execution results are stored in the mobile terminal. Also, as aforementioned, information of the application execution result may be stored by matching location information to it.

Meanwhile, an application 320 for a search query input to retrieve communication information and event related information may be installed in the mobile terminal. In FIG. 3, an application for receiving a search query given in spoken form is only disclosed. However, besides the voice input, the user may search for communication information and event related information through a text input, an image input, and the like.

When a search query is input via the application 320, the controller 180 transmits the search query to a separate API 330, and extracts at least one keyword 340 from the search query. Thereafter, the controller 180 searches a database 350 for information corresponding to the keyword to output a search result. The controller 180 searches not only the database 350 shown in FIG. 3 but also the above-described location information database for communication information and event related information.

First, a description will be given of an embodiment in which the controller 180 only retrieves information corresponding to a keyword from the database 350 illustrated in FIG. 3.

Figure 4:
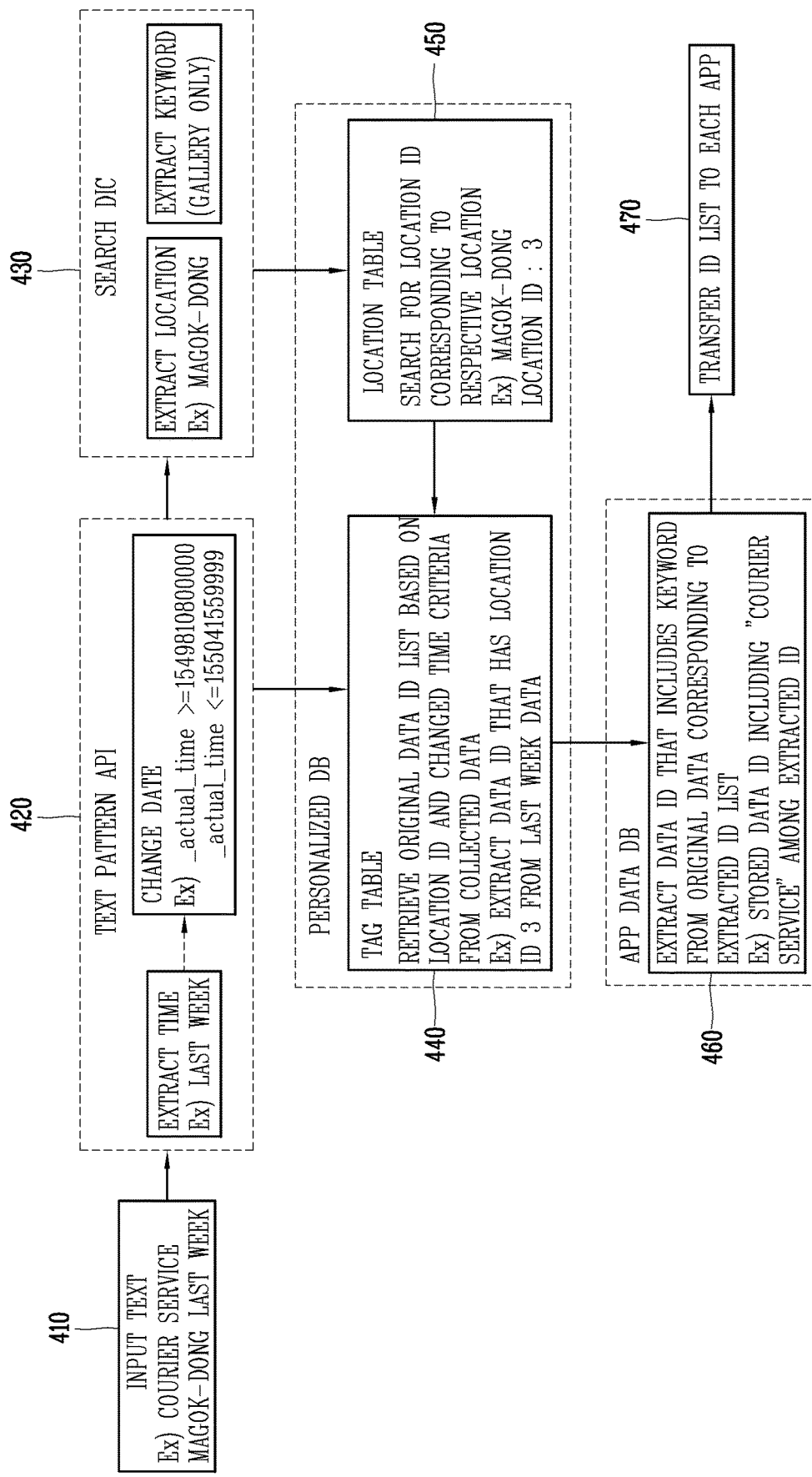
FIG. 4 is a flowchart illustrating one embodiment of searching pre-stored data using time information included in a search query.
Figure 5:
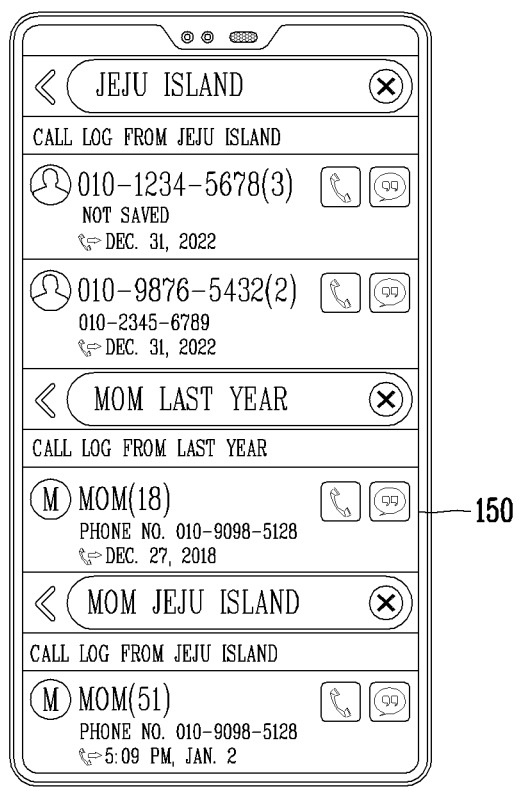
FIGS. 5 and 6 are conceptual views illustrating searching pre-stored data using location information or time information included in a search query, in accordance with one embodiment of the present disclosure.
Figure 6:
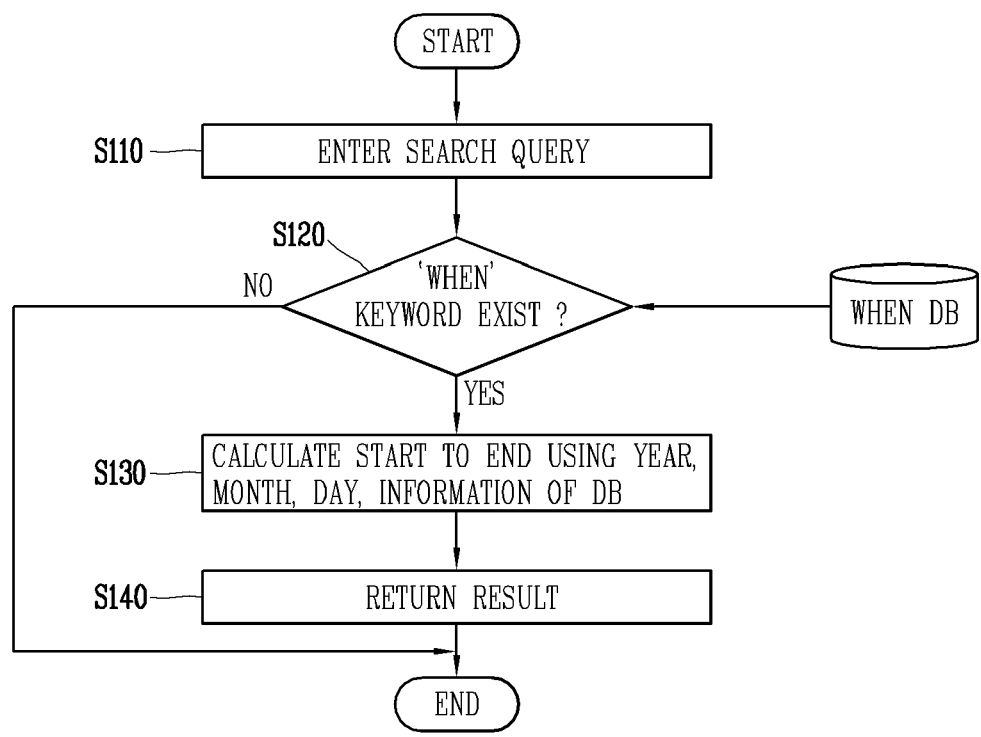

FIG. 4 is a flowchart illustrating one embodiment of searching pre-stored data using time information included in a search query, FIGS. 5 and 6 are conceptual views illustrating searching pre-stored data using location information or time information included in a search query, in accordance with one embodiment of the present disclosure.

Referring to FIG. 6, when the user inputs a search query (S110), the controller 180 checks if a keyword indicating time information exists in the search query (S120). When a keyword related to time information exists, the controller 180 extracts the keyword and then retrieves information corresponding to the keyword from the database 350 to output a search result.

Here, the keyword related to time information may be a date, a time, etc. representing an absolute time point, or a term representing a relative time point. For example, the time-related keyword may be time information based on the current time point such as "yesterday", "last week", and the like.

When the keyword related to time information represents the relative time point, the controller 180 may change the time information of the keyword to another time information based on the current time.

In one embodiment, referring to FIG. 4, when a search query "Courier service Magok-dong last week" is input (410) from the user, the controller 180 extracts a time-related keyword "last week" from the search query. The controller 180 changes (420) the extracted keyword to another time information based on the current time. Thereafter, the controller 180 searches the database 350 for information including the converted time information.

Meanwhile, the controller 180 searches for information including another keyword "courier service" included in the search query within a search result. Then the controller 180 outputs (470) the final search result.

Referring to FIG. 5, the user may input a search query to retrieve a list of calls sent or received with another terminal. In one embodiment, when the user inputs "Mom last year", the controller 180 extracts a keyword "last year" related to time information from the search query, and extracts the remaining keyword "Mom". Thereafter, the controller 180 changes "last year" to another time information based on the current time. The controller 180 searches the database 350 for information corresponding to the converted time information. Then the controller 180 searches for information including "Mom" within a search result to output a final search result.

As described above, the present disclosure allows the user to retrieve information desired from the database by combining a time-related keyword with another keyword included in a search query.

Hereinafter, an embodiment in which a user searches for information desired using a location-related keyword included in a search query in the mobile terminal according to the present disclosure will be described.

Figure 7:
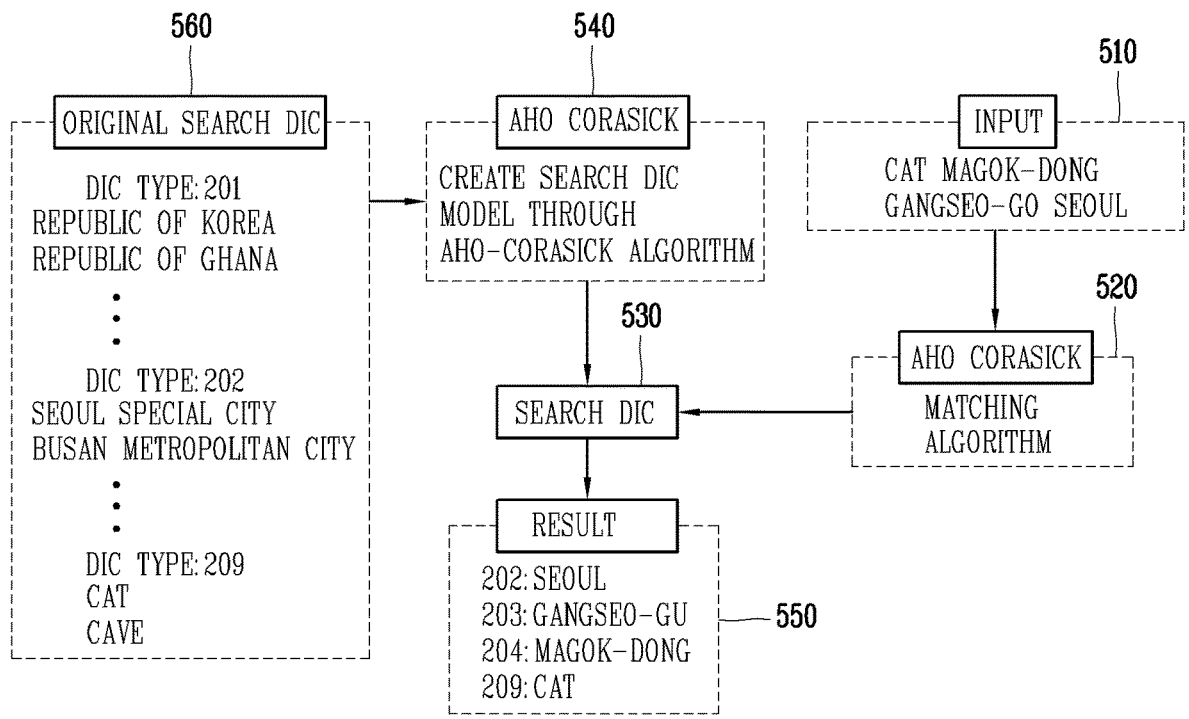
FIG. 7 is a conceptual view illustrating one embodiment of extracting a location-related keyword included in a search query in the mobile terminal according to the present disclosure.

FIG. 7 is a conceptual view illustrating one embodiment of extracting a location-related keyword included in a search query in the mobile terminal according to the present disclosure.

The controller 180 extracts a keyword associated with location information from a search query input by the user. Here, the keyword may be an address, a coordinate, a place name, a building name, and the like. However, the keyword is not limited thereto. In one exemplary embodiment, the controller 180 may compare the keyword with a plurality of pre-stored representative names to extract a keyword from the search query. For example, when the word of "home" is included in the search query, the controller 180 extracts the "home" as a keyword.

The controller 180 extracts a keyword related to location information from the search query, and then retrieves location information identical to the extracted keyword from the location information database.

Here, the controller 180 may retrieve location information identical to the keyword from the location information database. The controller 180 may also change the keyword initially to search for location information the same as the changed data. For example, when the extracted keyword is one of the plurality of pre-stored representative names, the controller 180 may change the representative name to any corresponding one of an address, a coordinate, a place name, and a building name to search if the changed data exists in the location information database.

Meanwhile, when a plurality of location-related keywords is included in the search query, the controller 180 may use part of the plurality of keywords for searching the database. In one embodiment, when one location-related keyword in a search query is a sub-concept of another location-related keyword, the controller 180 may only use the another location-related keyword for searching the database.

For example, referring to FIG. 7, when "Cat Magok-dong Gangseo-gu Seoul" is input (510) as a search query, the controller 180 may extract keywords "Magok-dong", "Gangseo-gu", and "Seoul" (550) related to location information from the search query. In this process, various algorithms for extracting the keywords may be used. For instance, the Aho-Corasick algorithm 540 may be used for keyword extraction.

Here, since the "Gangseo-gu", a place of address, is a subclass of "Seoul", and the "Magok-dong", a place of address, is a subclass of "Gangseo-gu" and "Seoul", the controller 180 searches if location information corresponding to "Magok-dong" exists in the location information database.

Referring back to FIG. 4, the controller 180 extract a time-related keyword, a location-related keyword, and the remaining keyword from the search query, and combines all the extracted keywords to search for information desired by the user.

Referring to FIG. 4, when a search query of "Courier service Magok-dong last week" is input (410) by the user, the controller 180 extracts a keyword "last week" related to time information from the search query. The controller 180 changes (420) the extracted keyword to another time information based on the current time.

Meanwhile, the controller 180 extracts "Magok-dong" from the search query, and then searches for location information including "Magok-dong". Then the controller 180 retrieves (450) data that includes location ID stored together with the searched location information and the converted time information from the database 350.

Thereafter, the controller 180 retrieves (460) data that includes "courier service" among the data including location ID stored together with the searched location information and the converted time information.

Lastly, the controller 180 outputs (470) a final search data. According to this present disclosure, information desired by the user can be accurately retrieved by combining various kinds of keywords included in a search query.

Referring back to FIG. 5, the user may input a search query to retrieve a list of calls sent or received with another terminal. In one embodiment, when the user inputs "Jeju Island Mom" for the search query, the controller 180 extracts a keyword "Jeju Island" related to location information and extracts the remaining keyword "Mom" from the search query. Then the controller 180 retrieves location information including "Jeju Island" from the location information. Thereafter, the controller 180 retrieves data that includes location ID stored together with the searched location information and "Mom" from the database 350, and output a search result.

Meanwhile, the above-described searching method is not limited to communication information, and it may be used for all event-related information.

FIG. 8 is a conceptual view illustrating one embodiment of retrieving an image previously captured by using time and location information.

Specifically, the aforementioned searching method may be used for retrieving an image previously captured and stored. When storing an image captured through the camera 121 of the mobile terminal 100 in the database 350, the controller 180 stores the captured image together with a time and a place taken. The controller 180 may utilize the time and the place stored together with the captured image for searching.

For example, referring to FIG. 8, when a search query of "Jeju Island last year" is input into a gallery application, the controller 180 extracts a time-related keyword "last year" and a location-related keyword "Jeju Island" from the search query.

Thereafter, the controller 180 changes the extracted keyword "last year" to another time information based on the current time. Meanwhile, the controller 180 retrieves location information including "Jeju Island" from the location information database. Then the controller 180 searches the database 350 for data that includes location ID stored together with the retrieved location information and the converted time information. After that, the controller 180 outputs the searched data.

Meanwhile, the controller 180 stores the captured image together with category data defining a type of the image. Here, the category data may be generated by a predetermined algorithm. If it takes a long time to create the category data, the category data does not necessarily have to be generated immediately after image capturing. In one embodiment, the category data may be stored after being collectively generated at a predetermined time.

As described above, according to the present disclosure, when a specific event is generated in the mobile terminal, information related to the event and additional information are stored together to make it easy to search later.

Meanwhile, according to the present disclosure, specific information is provided to the user by retrieving the specific information based on a terminal usage pattern of the user even when there is no search request of the user.

FIG. 9 is a conceptual view illustrating one embodiment in which specific information is provided to a user by retrieving the specific information based on a terminal usage pattern of the user even when there is no search request of the user.

Specifically, when a preset condition is satisfied, the controller 180 retrieves information from the database 350 and outputs a search result. Here, the preset condition may be that executing a specific application. In this case, a kind of database searched by the controller 180 may vary depending on a type of application executed.

In one embodiment, the controller 180 may search the database 350 for most called contacts each time the user executes a call application.

Meanwhile, when the preset condition is determined to be satisfied, the controller 180 searches the database 350 by using at least one of time information and location information. Specifically, in this case, the controller 180 may use the current time from a time point when the preset condition is satisfied for searching, or may collect the current location from the GPS to use for searching when the preset condition is satisfied.

For example, when the user executes the call application, the controller 180 may search for a list of calls (call history) including time information within a predetermined time period (or range) based on the current time. Then the controller 180 may display corresponding contacts from the most retrieved contact number. According to the present disclosure, most frequently contacted numbers at a specific time (period) can be provided to the user.

Further, when there is a rejected call within a specific time point based on the time at which the call application is executed, the controller 180 may display the rejected call as a recommended contact number.

As another example, when the user executes the call application, the controller 180 receives the current location information of the mobile terminal 100 through the GPS, and uses the location information to retrieve location information identical to it from the location information database. Thereafter, the controller 180 may output a list of calls matched to the searched location information by using location ID stored together with it. Further, the controller 180 may display corresponding contacts from the most frequently contacted number among the list of calls matched to the searched location information. According to the present disclosure, when the mobile terminal 100 is located in a specific place, most frequently contacted numbers in the specific place can be provided.

Referring to FIG. 9, when the user executes the call application, a recommended contact number may be displayed in one area 610 of an execution screen of the call application. When the user applies a touch to the one area 610, all recommended contacts 620 searched by the controller 180 may be displayed. Meanwhile, when the user touches the one area 610, a list of received and sent calls with the recommended contacts may be displayed as illustrated in (c) of FIG. 9.

Meanwhile, the present disclosure periodically retrieves pre-stored communication information for providing a reminder to the user.

Figure 11A:
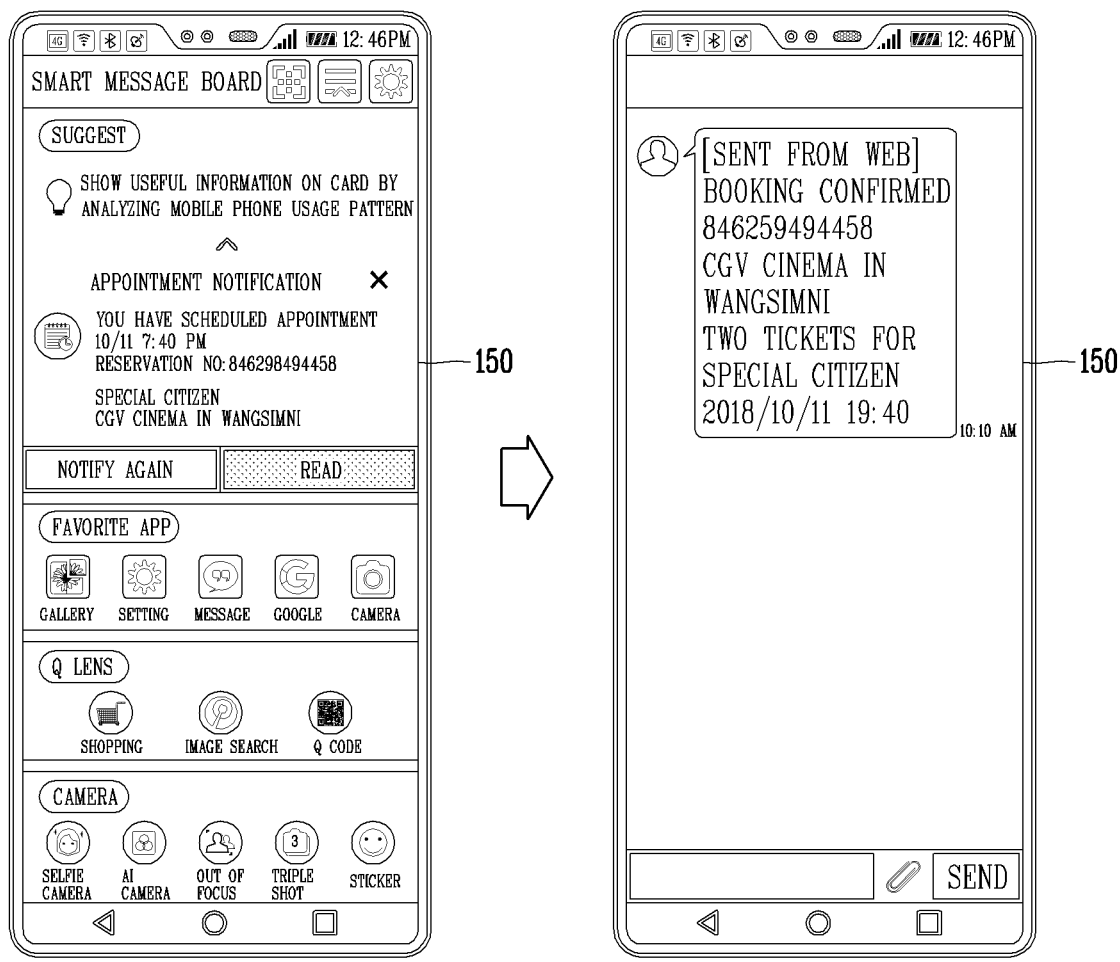
FIGS. 11A and 11B are conceptual views illustrating providing a reminder to a user using a pre-stored text message, in accordance with one embodiment of the present disclosure.
Figure 11B:
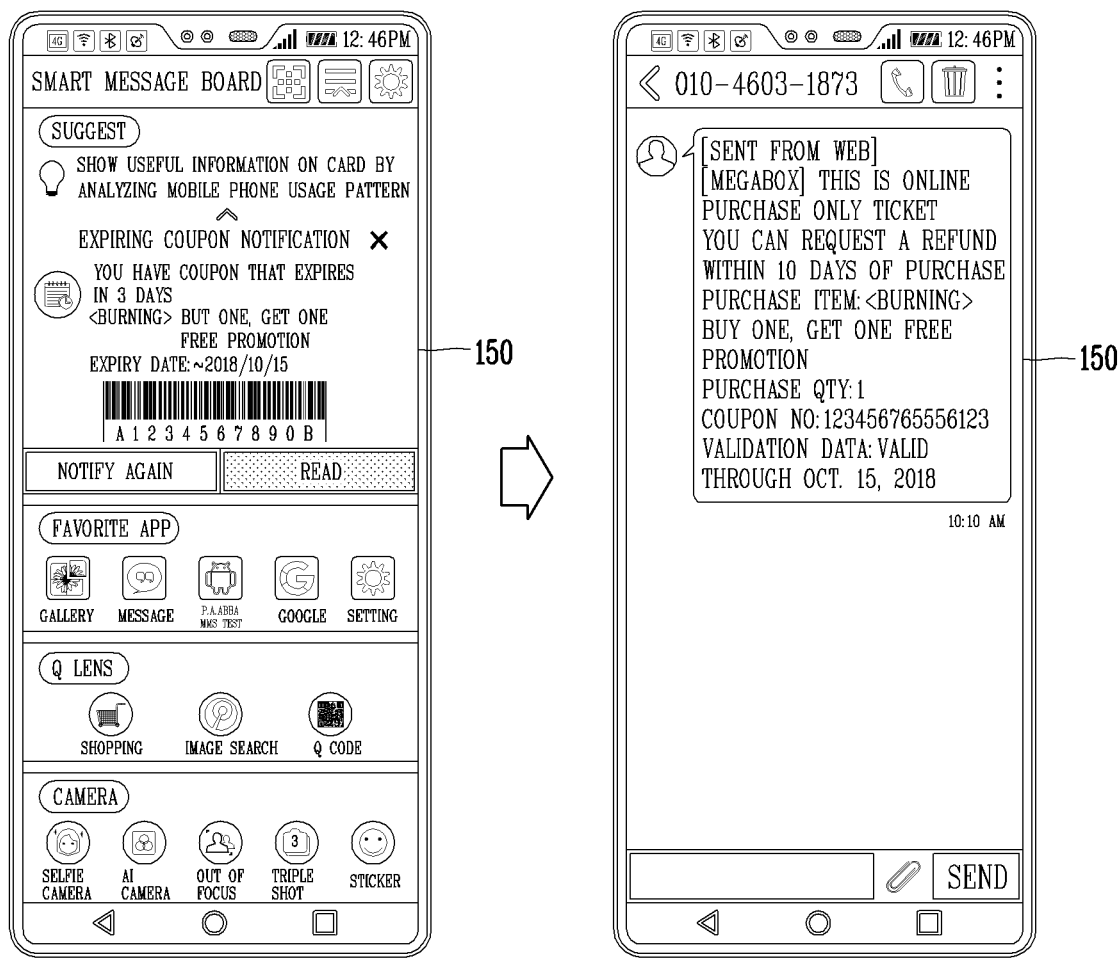

FIG. 10 is a flowchart illustrating one embodiment of providing a reminder to a user using a pre-stored text message, and FIGS. 11A and 11B are conceptual views illustrating providing a reminder to a user using a pre-stored text message, in accordance with one embodiment of the present disclosure.

Referring to FIG. 10, when a text message is received from an external terminal (S210), the controller 180 stores the received text message in a preset database. Accordingly, a plurality of text messages is stored in the preset database.

Thereafter, the controller 180 collects the received text message (S230), and extracts a keyword. The controller 180 determines whether the corresponding text message needs to be reminded using the extracted keyword (S240).

The present disclosure extracts a specific keyword from a text message stored in the database 350, and determines a type of the stored text message using the specific keyword.

For example, the controller 180 extracts a specific keyword from the text message to determine its type. The text message may be a coupon with an expiration date or a booking confirmation. The controller 180 may extract a keyword related to a coupon or a reservation included in the text message to analyze. In one embodiment, the controller 180 extracts keywords such as "reservation confirmed", "reservation number", "reservation date", and the like included in the text message to analyze whether the text message needs to be reminded.

The controller 180 stores a text message to be reminded in a separate database (S250). The controller 180 stores a due date for reminders together with the text message to be reminded.

Thereafter, the controller 180 checks if there is a text message for reminders at a designated time every day (S260). When a text message for reminders exists, the controller 180 outputs a reminder message.

Meanwhile, when a date is changed (S310) while the reminder message is being displayed, the controller 180 stops displaying the reminder message (S320), and analyzes the pre-stored database to output a new reminder message.

Referring to FIG. 11A, the controller 180 extracts a keyword "reservation confirmed" from a text message to determine that the text message is a booking confirmation message. Thereafter, the controller 180 extracts time information from the text message and outputs a reminder message before the time corresponding to the extracted time information arrives.

Referring to FIG. 11B, the controller 180 extracts a keyword "coupon number" from a text message to determine that the text message is a text message coupon.

Thereafter, the controller 180 extracts time information from the text message and outputs a reminder message before the time corresponding to the extracted time information arrives.

As described above, the present disclosure analyzes a received text message to provide reminders to the user.

Hereinafter, a method for inputting a search query for a database search will be described. The search query may be input via an artificial intelligence (AI) agent provided in the mobile terminal. Hereinafter, the AI agent will be described in detail.

Figure 12A:
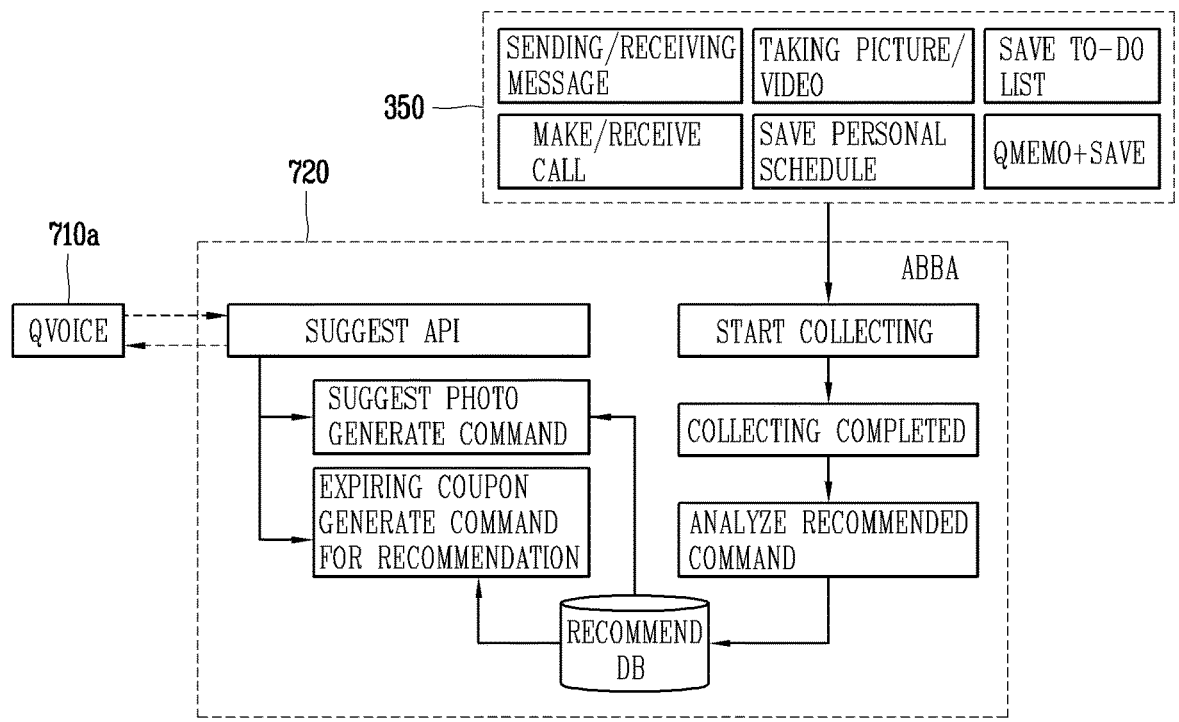
FIGS. 12A and 12B are conceptual views illustrating a state in which two or more artificial intelligence (AI) agents are interconnected.
Figure 12B:
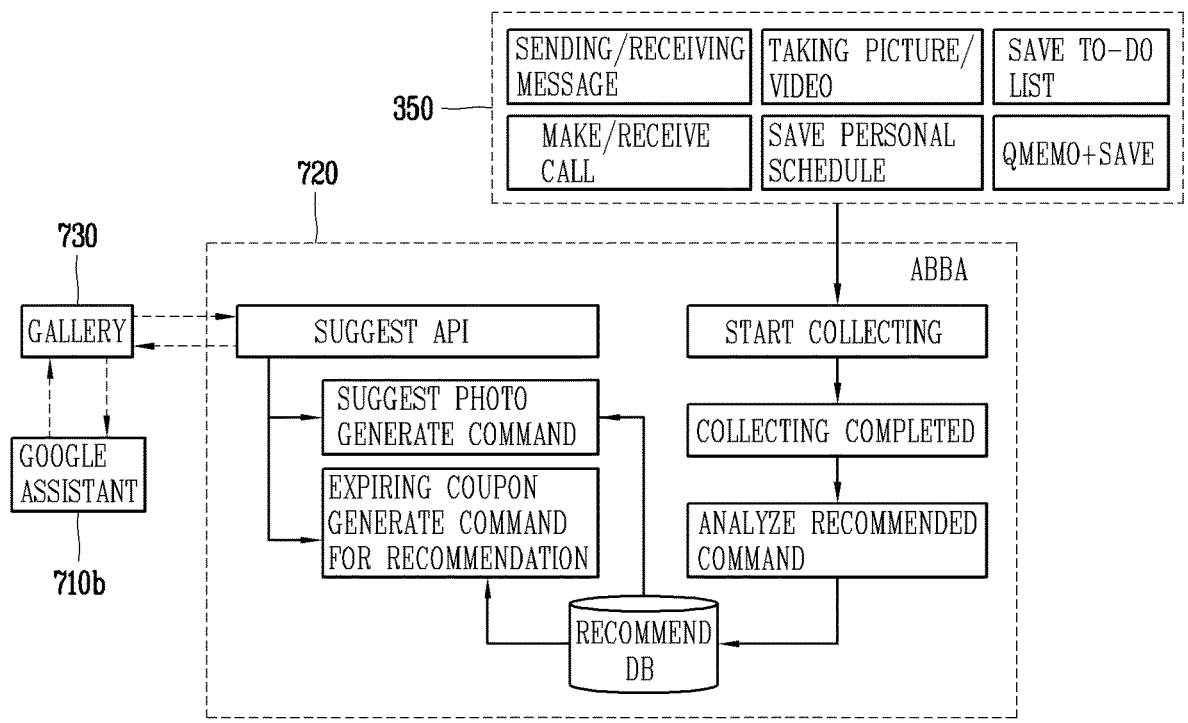

FIGS. 12A and 12B are conceptual views illustrating a state in which two or more AI agents are interconnected.

An agent is an autonomous process or entity that acts on behalf of a user for achieving a specific goal. Here, the agent is not a concept existing independently of another, but it may be understood as a software installed in the mobile terminal. However, the present disclosure is not limited thereto, the agent may be a system including a server capable of performing wireless communications with the mobile terminal, and the like. The agent interacts with the user and an external environment through the components included in the mobile terminal 100.

Specifically, the agent receives command information from the user through the components included in the mobile terminal, and determines a specific control to perform based on the command information. Thereafter, the agent receives information needed to perform the specific control through the components included in the mobile terminal.

In this specification, information received from the user is defined as command information to specify a control to be performed by the agent. The command information may be input via various elements, and may be a different type depending on the input element. For example, the command information may be input by using at least one of a voice, video, and text element.

The agent may be classified into a voice (or speech) recognition agent, a text recognition agent, and the like according to a command input element.

For example, the voice recognition agent receives a spoken command (information) from the user through the microphone 122 included in the mobile terminal 100, and performs a control related to the received spoken command.

As another example, the text recognition agent receives a textual command (information) from the user through the touch screen 151, and performs a control related to the received text command.

Meanwhile, the command information may include various kinds of information. For example, the command information may include a type of functions operable in the mobile terminal, start/end time of function execution, start/end criteria for function execution, and the like.

Meanwhile, the AI agent described herein analyzes the meaning of command information by using data stored in the controller 180 and the artificial intelligence unit 130. Specifically, when the command information is a command of natural language, the AI agent uses a natural language processing function of the controller 180 to analyze what a user's intended task is. In more detail, the AI agent extracts the type of function that may be operated in the mobile terminal, start/end time of function execution, start/end criteria for function execution, and the like based on the command information of the natural language, and perform control accordingly.

In addition, the AI agent predicts (or infers) at least one operation of the mobile terminal from the command information using information learned by the aforementioned machine learning technology, and controls the mobile terminal such that the most feasible operation among the predicted operations is performed.

In this specification, the AI agent is described to control the components of the mobile terminal 100 for convenience of explanation. However, the AI agent is substantially implemented by data stored in the controller 180 and the artificial intelligence unit 130, so it may be understood that the controller 180 controls the components of the mobile terminal 100 by using the data stored in the artificial intelligence unit 130. In other words, the control by the AI agent and the control by the controller 180 using the data stored in the artificial intelligence unit 130 are substantially the same in this specification.

Meanwhile, the AI agent according to the present disclosure may be applied to various types of agents. For example, the AI agent according to the present disclosure may be applied to a voice recognition agent and a text recognition agent, respectively.

As described in FIGS. 1 to 9, an entity that performs a search for specified criteria in pre-stored database and outputs a search result when a search query is input by a user or a preset condition is satisfied.

The mobile terminal 100 may include a plurality of different AI agents. Part of the plurality of AI agents may be installed at the time of shipment, and another part of the remaining AI agents may be installed by a user.

Reception of a search query from the user and a search using the search query may be performed by different agents. Hereinafter, a method for providing a search result corresponding to a search query input from the user by interconnecting different agents will be described.

First, the method of inputting a search query through an AI agent will be described. Although the AI agent described below is a voice recognition AI agent, the present disclosure is not limited thereto.

The user may execute the voice recognition AI agent by speaking a specific keyword.

For example, when the user speaks a wake-up signal (or wake-up word), the AI agent is executed.

Here, the mobile terminal may always keep the microphone 122 on in order to receive the wake-up signal from the user. However, the mobile terminal does not perform control related to voice information received until the wake-up signal is received.

When the wake-up signal is received, the mobile terminal executes the voice recognition AI agent, and displays an execution screen of the voice recognition AI agent instead of the currently displayed screen information. The currently displayed screen information may be a home screen of the mobile terminal or an application execution screen. Meanwhile, a graphic object for informing whether or not activate voice recognition may be displayed on the execution screen of the voice recognition AI agent.

Meanwhile, when the wake-up signal is received, the mobile terminal may display an execution screen of the voice recognition AI agent, and activate voice recognition. In more detail, when the wake-up signal is received, the mobile terminal may execute the voice recognition AI agent and immediately activates the voice recognition. At this time, a graphic object for informing whether or not activate the voice recognition and a text indicating that the voice recognition is activated may be displayed.

The mobile terminal may include a plurality of voice recognition AI agents. A different AI agent may be activated according to a type of wake-up signal received through the microphone 122. Thereafter, a search command input from the user is performed by an activated AI agent (hereinafter referred to as "first AI agent").

When a search command from the user is received, the voice recognition AI agent converts the spoken command into written text, and extracts a search keyword from the converted text. Thereafter, the extracted search keyword is transmitted to a search AI agent (hereinafter referred to as "second AI agent").

Here, a transmission path (or channel) of the search keyword may vary depending on a type of the voice recognition AI agent. For example, referring to FIG. 12A, a first AI agent 710a extracts a search keyword from a search command of the user, and immediately transmits the extracted search keyword to a second AI agent 720. Then the second AI agent 720 performs a search using the method described in FIGS. 2 to 9 to transfer a search result to the first AI agent 710a. The first AI agent 710a outputs the received search result. That is, the search result may be displayed on an execution screen of the first AI agent 710a.

On the other hand, the first AI agent may not by interconnected with the second AI agent depending on a type of the AI agent. For example, if a first AI agent is installed at the time of mobile terminal shipment, and a second AI agent is installed by the user, they may not be interconnected with each other. In this case, referring to FIG. 12B, the first AI agent 710b transmits a search keyword extracted from a search command of the user to a specific application 730 that can be interconnected with the second AI agent 720. The specific application 730 transmits the extracted search keyword to the second AI agent 720. Thereafter, the second AI agent 720 transmits a search result to the specific application 730, and the specific application 730 transmits the search result to the first AI agent 710b.

The method illustrated in FIG. 12B may be utilized when interconnecting different AI agents installed in respective terminals.

Figure 13:
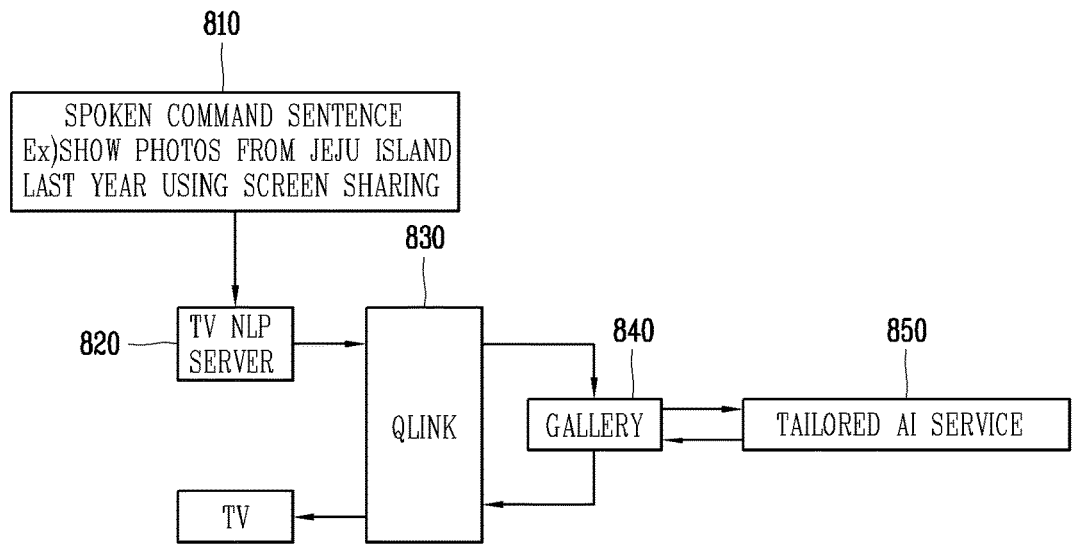
FIG. 13 is a conceptual view illustrating one embodiment in which a search command is input via an AI agent installed in an image display device, and a search is performed in a mobile terminal.
Figure 14:
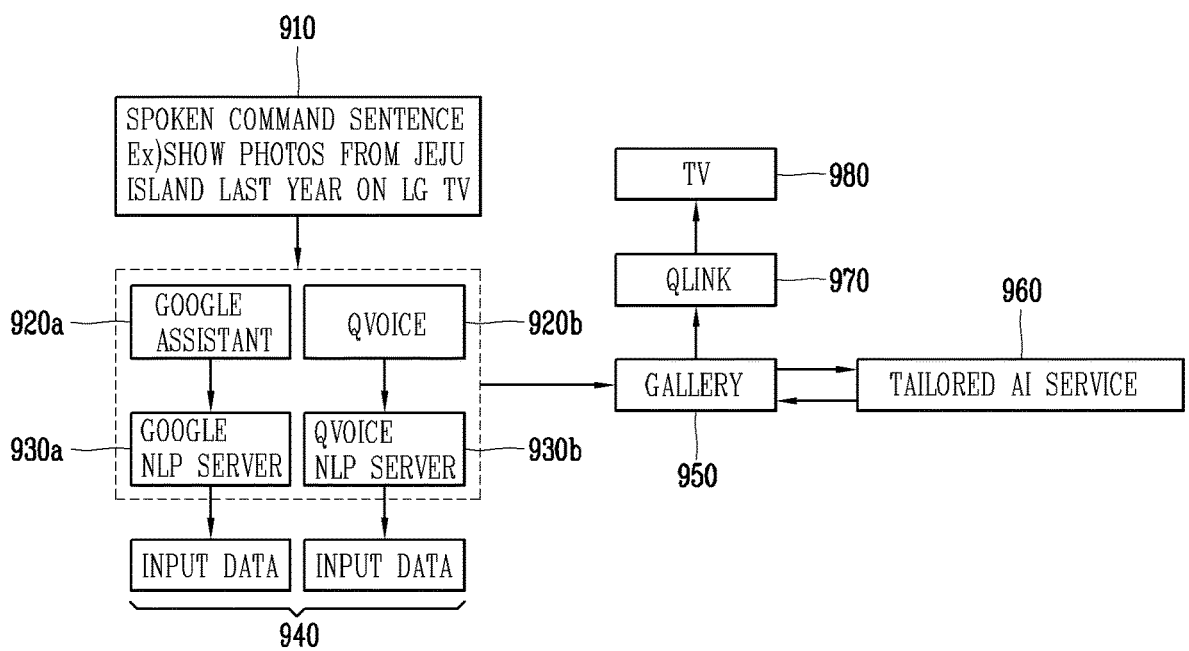
FIG. 14 is a conceptual view illustrating one embodiment in which a search command is input via an AI agent installed in a mobile terminal, and a search result is displayed on an image display device.

FIG. 13 is a conceptual view illustrating one embodiment in which a search command is input via an AI agent installed in an image display device, and a search is performed in a mobile terminal. FIG. 14 is a conceptual view illustrating one embodiment in which a search command is input via an AI agent installed in a mobile terminal, and a search result is displayed on an image display device.

Referring to FIG. 13, the user may input a search command through an image display device. The AI agent may be installed in the image display device, and the AI agent installed in the image display device receives a spoken search command from the user, converts the spoken command into written text, and extracts a search keyword. The extracted search keyword is transmitted to a specific application of the mobile terminal, and the specific application transfers the search keyword to a search AI agent installed in the mobile terminal. The search AI agent performs a search using the search keyword and transmits a search result to the specific application. Thereafter, the specific application transfers the search result to the image display device. Accordingly, the search result in the mobile terminal can be displayed on the image display device.

Referring to FIG. 14, the user may input a search command through the mobile terminal. An AI agent installed in the mobile terminal receives a spoken search command from the user, converts the spoken search command into written text and extracts a search keyword. The extracted search keyword is transmitted to a specific application of the mobile terminal, and the specific application transfers the search keyword to a search AI agent installed in the mobile terminal. The search AI agent performs a search using the search keyword and transmits a search result to the specific application. Then the specific application transfers the search result to an image display device. Accordingly, the search result in the mobile terminal can be displayed on the image display device.

As described above, in the present disclosure, different agents can be interconnected to each other by using a specific application as a medium when directly connecting the different agents are not available.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. The above detailed description should not be limitedly construed in all aspects and should be considered as illustrative. Therefore, all changes and modifications that fall within the metes and bounds of the claims, or equivalents of such metes and bounds are therefore intended to be embraced by the appended claims.

The invention claimed is:

1. A mobile terminal comprising:
   a camera;
   a touch screen configured to display screen information;
   a first artificial intelligence (AI) agent that extracts a search keyword from a search command for searching image information;
   a second AI agent that retrieves at least one piece of image information corresponding to an input search keyword from pre-stored image information; and
   a controller configured to:
   activate the camera in response to a request, and store an image captured through the camera,
   in response to the search command, control the first AI agent to convert the search command into converted text and extract the search keyword from the converted text,
   identify whether the first AI agent is interconnected with the second AI agent and determine a transmission path of the search keyword,
   transmit the search keyword to the second AI agent according to the determined transmission path,
   create category information defining a type of the captured image via the second AI agent,
   match the captured image with the category information and store the matched information,
   retrieve the at least one piece of image information corresponding to the search keyword from the pre-stored image information using the category information,
   transmit the image information search result to the first AI agent according to the determined transmission path, and
   control the first AI agent to display the image information search result on an execution screen of the first AI agent.

2. The mobile terminal of claim 1, wherein the controller is further configured to:
   collect location information and time information when capturing the image, and store the captured image by matching the collected location information and time information to the captured image.

3. The mobile terminal of claim 2, wherein the controller is further configured to:
retrieve the at least one piece of image information corresponding to the search keyword from the pre-stored image information using at least one of the location information, the time information, and the category information.

4. The mobile terminal of claim 3, wherein the controller is further configured to:
generate the category information at a different time point from when the location information and the time information are collected.

5. The mobile terminal of claim 4, wherein the controller is further configured to:
collect the location information and the time information when capturing the image, and
generate the category information at a predetermined time via the second AI agent.

6. The mobile terminal of claim 1, further comprising:
a microphone configured to receive voice information,
wherein the controller is further configured to:
activate the first AI agent in response to a voice included in the received voice information, and
receive the search command through the microphone while the first AI agent is activated.

7. The mobile terminal of claim 6, wherein the controller is further configured to:
activate the first AI agent when a wake-up word is included in the received voice information.

8. The mobile terminal of claim 7, wherein the controller is further configured to:
activate a different AI agent according to a type of the wake-up word, and
display the at least one piece of image information corresponding to the search keyword among the pre-stored image information on an execution screen of the activated AI agent.

9. The mobile terminal of claim 1, wherein the controller is further configured to:
when the first AI agent is not interconnected with the second AI agent:
determine that a specific application is included in the transmission path,
transfer the search result from the second AI agent to the specific application, and
transfer the search result from the specific application to the first AI agent.

10. The mobile terminal of claim 9, wherein the controller is further configured to:
when the first AI agent is interconnected with the second AI agent:
determine that the specific application is not included in the transmission path,
directly transfer the extracted search keyword from the first AI agent to the second AI agent, and
directly transfer the search result from the second AI agent to the first AI agent.

11. A method for controlling a mobile terminal having a first artificial intelligence (AI) agent and a second AI agent, the method comprising:
activating a camera in response to a request and storing an image captured through the camera;
receiving, via the first AI agent, a search command for retrieving image information;
converting via the first AI agent, the search command into converted text;
extracting, via the first AI agent, a search keyword from the converted text;
identifying whether the first AI agent is interconnected with the second AI agent and determining a transmission path of the search keyword;
transmitting the search keyword to the second AI agent according to the determined transmission path;
creating category information defining a type of the captured image via the second AI agent,
matching the captured image with the category information and store the matched information,
retrieving the at least one piece of image information corresponding to the search keyword from the pre-stored image information using the category information,
transmitting a search result of at least one piece of image information retrieved by the second AI agent to the first AI agent according to the determined transmission path; and
displaying, via a touch screen of the mobile terminal, a search result of the image information on an execution screen of the first AI agent.

12. The method of claim 11, further comprising:
collecting location information and time information when capturing the image; and
storing the captured image by matching the collected location information and time information to the captured image.

13. The method of claim 12, further comprising:
retrieving the at least one piece of image information corresponding to the search keyword from the pre-stored image information using at least one of the location information, the time information, and the category information.

14. The method of claim 13, further comprising:
generating the category information at a different time point from when the location information and the time information are collected.

15. The method of claim 14, further comprising:
collecting the location information and the time information when capturing the image; and
generating the category information at a predetermined time via the second AI agent.

16. The method of claim 11, further comprising:
activating the first AI agent in response to a voice included in voice information received via a microphone included in the mobile terminal; and
receiving the search command through the microphone while the first AI agent is activated.

* * * * *